US007427862B2

(12) United States Patent
Dashevsky et al.

(10) Patent No.: US 7,427,862 B2
(45) Date of Patent: Sep. 23, 2008

(54) INCREASING THE RESOLUTION OF ELECTROMAGNETIC TOOLS FOR RESISTIVITY EVALUATIONS IN NEAR BOREHOLE ZONES

(75) Inventors: Yuliy A. Dashevsky, Novosibirsk (RU); Gleb A. Borisov, Ufa (RU); Michail I. Epov, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 174 days.

(21) Appl. No.: 11/537,105

(22) Filed: Sep. 29, 2006

(65) Prior Publication Data

US 2008/0079431 A1    Apr. 3, 2008

(51) Int. Cl.
*G01V 3/10* (2006.01)
(52) U.S. Cl. .......................................... 324/339; 702/7
(58) Field of Classification Search ......... 324/333–339; 702/6–7
See application file for complete search history.

(56) References Cited

U.S. PATENT DOCUMENTS

| | | | | |
|---|---|---|---|---|
| 4,012,689 | A | * | 3/1977 | Cox et al. .................... 324/341 |
| 5,442,294 | A | | 8/1995 | Rorden |
| 6,188,222 | B1 | * | 2/2001 | Seydoux et al. ............. 324/339 |
| 6,344,746 | B1 | | 2/2002 | Chunduru et al. |
| 6,906,521 | B2 | | 6/2005 | Tabarovsky |
| 2002/0113592 | A1 | | 8/2002 | Omeragic |
| 2003/0107378 | A1 | * | 6/2003 | Strickland et al. ........... 324/339 |
| 2003/0117142 | A1 | | 6/2003 | Amini |
| 2003/0164705 | A1 | | 9/2003 | Cheung et al. |
| 2004/0017197 | A1 | | 1/2004 | Chen et al. |
| 2004/0056663 | A1 | | 3/2004 | Sinclair et al. |
| 2004/0117120 | A1 | | 6/2004 | Frenkel et al. |
| 2004/0178796 | A1 | | 9/2004 | Heid |
| 2004/0183538 | A1 | | 9/2004 | Hanstein et al. |
| 2005/0001623 | A1 | | 1/2005 | Hanstein et al. |
| 2005/0030059 | A1 | | 2/2005 | Tabarovsky et al. |
| 2005/0077902 | A1 | | 4/2005 | MacGregor et al. |
| 2005/0134279 | A1 | | 6/2005 | Hu et al. |
| 2005/0189945 | A1 | | 9/2005 | Reiderman |
| 2005/0218898 | A1 | | 10/2005 | Fredette et al. |
| 2005/0242819 | A1 | | 11/2005 | Gold et al. |
| 2005/0264293 | A1 | | 12/2005 | Gao et al. |
| 2006/0192562 | A1 | | 8/2006 | Davydychev et al. |
| 2006/0202699 | A1 | | 9/2006 | Reiderman |
| 2006/0214664 | A1 | | 9/2006 | Folberth et al. |
| 2006/0290354 | A1 | | 12/2006 | Fredette et al. |
| 2007/0030008 | A1 | | 2/2007 | Cheung et al. |

* cited by examiner

*Primary Examiner*—Jay M Patidar
(74) *Attorney, Agent, or Firm*—Cantor Colburn LLP

(57) ABSTRACT

A tool for performing electromagnetic measurements within a borehole includes a transmitter including a coil having N-turns wound coaxially around a long metallic mandrel and a receiver including a coil having a one-turn receiving loop wound coaxially around the mandrel; wherein the transmitter is adapted for providing a current I of a predetermined frequency $f$ of a maximum intensity in a predetermined part of a near borehole zone; and wherein the receiver is disposed a distance L from the transmitter and adapted for receiving a signal from the transmitter. A method for use of the tool is provided.

14 Claims, 8 Drawing Sheets

--PRIOR ART--

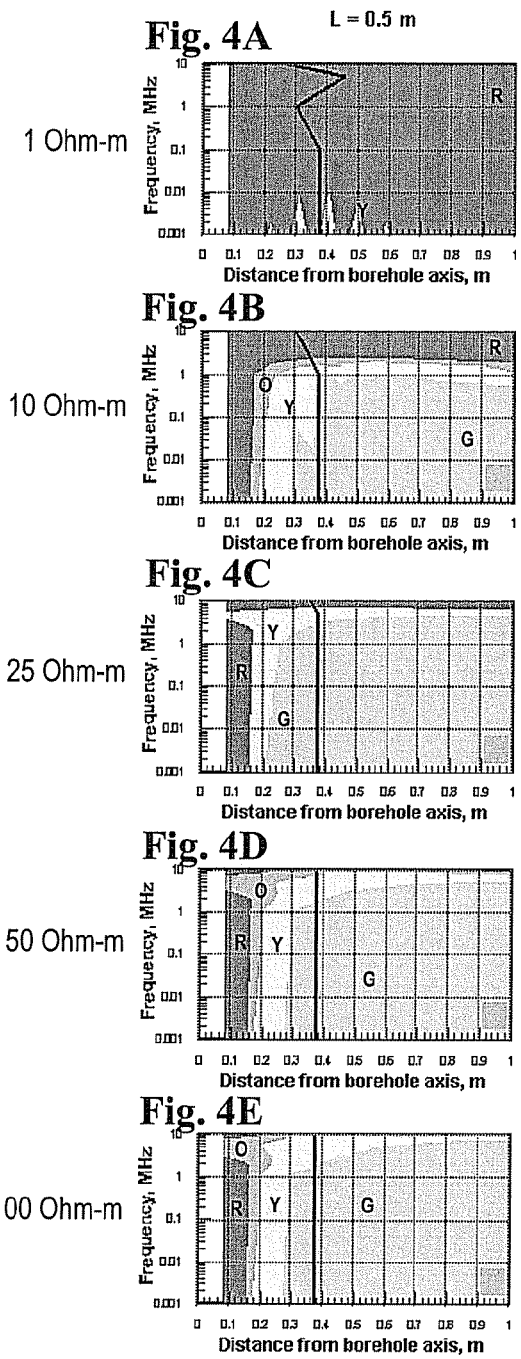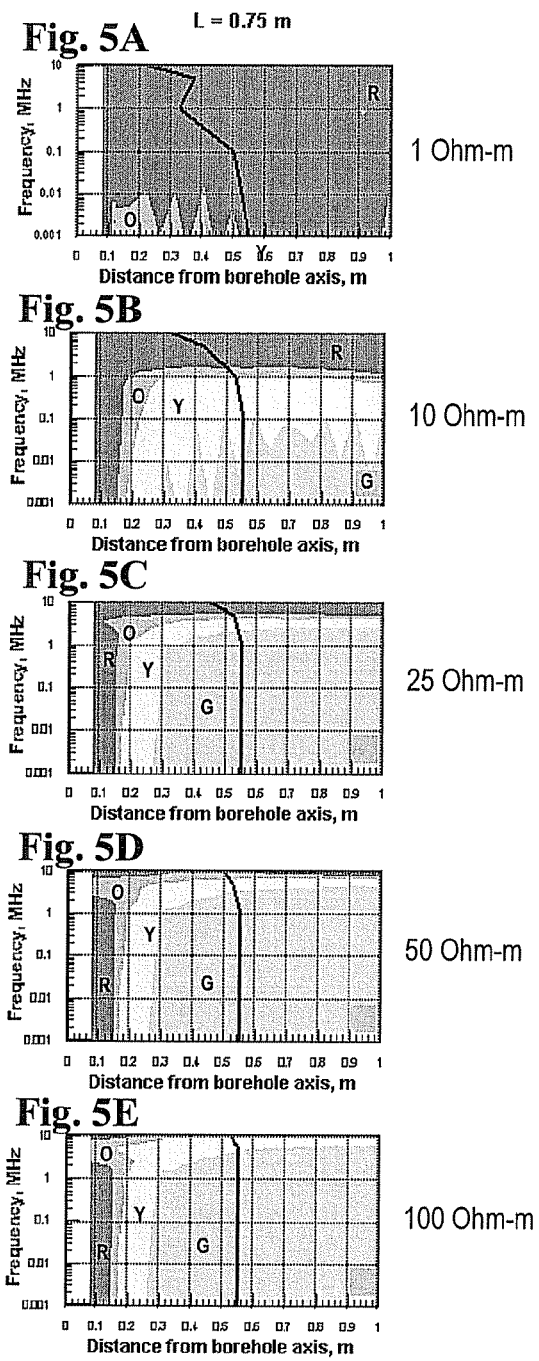

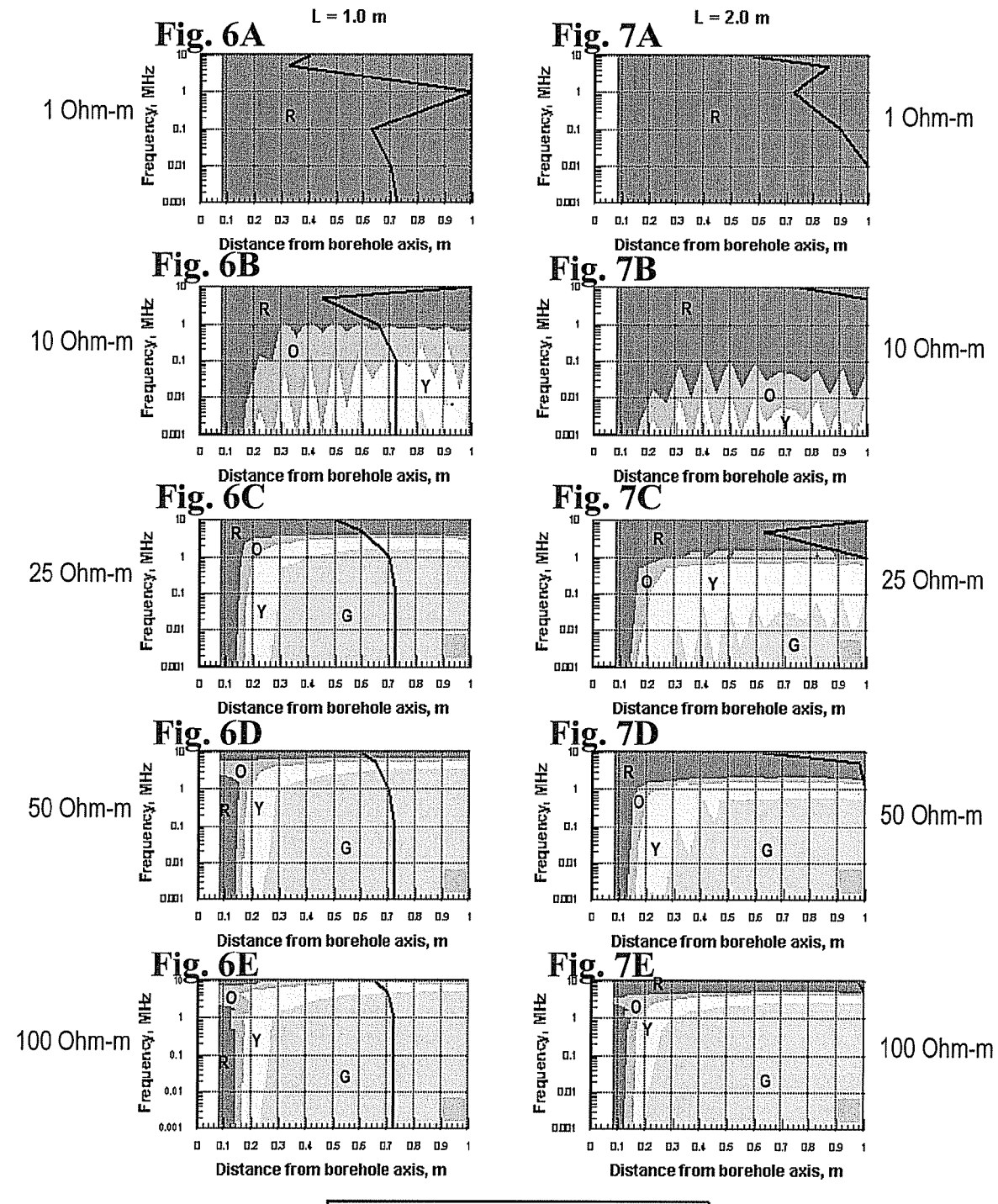

10 Ohm-m

25 Ohm-m

50 Ohm-m

100 Ohm-m

Tool Length, m
— 0.4  — 0.5  — 0.6  — 0.75  — 1

INCREASING THE RESOLUTION OF ELECTROMAGNETIC TOOLS FOR RESISTIVITY EVALUATIONS IN NEAR BOREHOLE ZONES

BACKGROUND OF THE INVENTION

1. Field of the Invention

The present invention relates generally to tools for well logging, and in particular, to improving the information provided by an electromagnetic (EM) well logging tool.

2. Description of the Related Art

The continuing search for petrochemical materials calls for increasingly aggressive and sophisticated exploration. A necessary part of this exploration involves drilling boreholes into the earth and the coincident creation of deep wells. Examination and evaluation of subterranean formations in the vicinity of the deep wells is completed by a process referred to as well logging.

During well logging, an area near the borehole (i.e., referred to as a near borehole zone) is subject to fluid invasion. Using drilling data and other logging measurements to analyze properties of the invaded zone, one can reach important conclusions about the mineral content.

A variety of tools and techniques for well logging use sophisticated technology for assessing aspects of formations in the vicinity of the borehole. Exemplary well logging tools apply electromagnetic fields, neutron measurements, density determinations and nuclear magnetic resonance (NMR) imaging.

Regarding use of electromagnetic (EM) fields, the resistivity R and other data provided are typically indicative of aspects of surrounding formations that lie in the near borehole zone (considered to be generally from a wall or surface of the borehole and upto about one meter into the surrounding earth) and some distance beyond.

Measurements taken with an electromagnetic (EM) tool can provide valuable information describing a variety of aspects of surrounding formations. However, one skilled in the art will recognize that features of the near borehole zone dominate the results for many measurements. Therefore, it is particularly desirable to produce information describing physical aspects associated with the near borehole zone.

For example, knowing a distribution of the resistivity R, one can make estimations regarding aspects such as filtration capacity for a local reservoir. Furthermore, knowledge and evaluation of the resistivity R within the near borehole zone provides for extracting petrophysical data regarding properties that include permeability, capillary pressure, and relative permeability of the surrounding formations. It is desirable to have knowledge of these properties for the near borehole zone, as each of these properties are useful in making determinations regarding petrophysical conditions.

Although EM tools have considerable value for well logging, typical measurements provide for petrophysical data in areas beyond the near borehole zone. That is, current techniques for use of EM tools do not realize the potential therein for providing meaningful data within (i.e., isolated to) the near borehole zone.

What are needed are techniques for making measurements with an electromagnetic tool, where the measurements provide for determinations regarding petrophysical properties in the near borehole zone.

BRIEF SUMMARY OF THE INVENTION

Embodiments of the invention include a tool for performing electromagnetic measurements within a borehole, includes: a transmitter including a coil having N-turns wound coaxially around a long metallic mandrel and a receiver including a coil having a one-turn receiving loop wound coaxially around the mandrel; wherein the transmitter is adapted for providing a current I of a predetermined frequency $f$ at a maximum intensity in near borehole zone; and wherein the receiver is disposed a distance L from the transmitter and adapted for receiving a signal from the transmitter.

Also included is method and a computer program product for determining properties of formations in a near borehole zone. The method and computer program product calling for: applying a signal to a tool disposed into a borehole, the tool including a transmitter including a coil having N-turns wound coaxially around a long metallic mandrel and a receiver including a coil having a one-turn receiving loop wound coaxially around the mandrel; wherein the transmitter is adapted for providing a current I of a predetermined frequency $f$ at a maximum intensity in near borehole zone; and wherein the receiver is disposed a distance L from the transmitter and adapted for receiving a signal from the transmitter; generating the maximum intensity of the current I within the near borehole zone; receiving the signal from the near borehole zone with the receiver; and analyzing the signal to determine the properties of the formations.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4A through FIG. 4E, collectively referred to herein as FIG. 4, depict aspects of an electric field for the EM tool having a length L of about 0.5 meters;

FIG. 5A through FIG. 5E, collectively referred to herein as FIG. 5, depict aspects of an electric field for the EM tool having a length L of about 0.75 meters;

FIG. 6A through FIG. 6E, collectively referred to herein as FIG. 6, depict aspects of an electric field for the EM tool having a length L of about 1.0 meters;

FIG. 7A through FIG. 7E, collectively referred to herein as FIG. 7, depict aspects of an electric field an EM tool having a length L of about 2.0 meters;

The detailed description explains the preferred embodiments of the invention, together with advantages and features, by way of example with reference to the drawings.

DETAILED DESCRIPTION OF THE INVENTION

Figure 1:
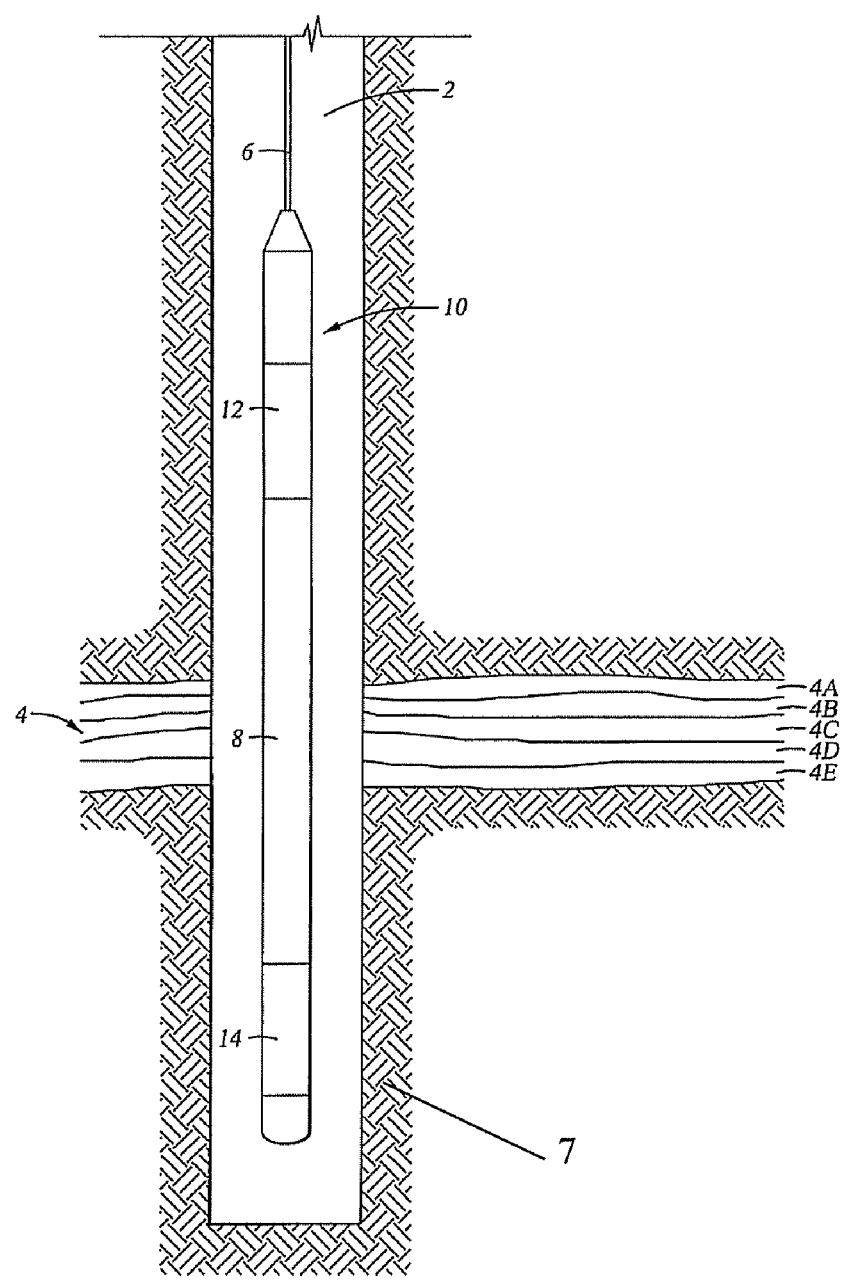
FIG. 1 depicts aspects of a borehole.

Referring to FIG. 1, an exemplary electromagnetic induction well logging tool 10 is shown disposed in a borehole 2. The borehole 2 is drilled through earth 7 and penetrates formations 4, which include various layers 4A-4E. The tool 10 is typically lowered into and withdrawn from the borehole 2 by use of an armored electrical cable 6 or similar conveyance as is known in the art. The tool 10 is typically assembled from three subsections: an auxiliary electronics unit 14 disposed at one end of the tool 10; a coil mandrel unit 8 attached to the auxiliary electronics unit 14; and an electronics unit 12 attached to the other end of the coil mandrel unit 8, the electronics unit 12 typically being attached to the cable 6.

The coil mandrel unit 8 includes a set of coils which includes induction transmitter coils and receiver coils. The set of coils, as will be further explained, are for inducing electromagnetic fields in the formations 4 and for receiving voltage signals induced by eddy currents flowing in the formations 4 as a result of the electromagnetic fields induced therein.

The auxiliary electronics unit 14 typically contains a receiver, signal processing capabilities and telemetry capabilities (not shown). The auxiliary electronics unit 14 also typically includes a signal generator and power amplifiers (not shown), which cause alternating currents of selected frequencies to flow through transmitter coils in the coil mandrel unit 8.

In typical embodiments, the electronics unit 12 includes receiver circuits (not shown) for detecting voltages induced in receiver coils in the coil mandrel unit 8, and circuits for processing these received voltages (not shown) into signals representative of the conductivities of various layers 4A-4E of the formations 4. As a matter of convenience, the electronics unit 12 typically includes signal telemetry to transmit conductivity related signals to the surface of the earth 7 via the cable 6 for further processing. Alternatively, the electronics unit 12 can store the conductivity related signals in an appropriate recording device (not shown) for processing after the instrument 10 is withdrawn from the borehole 2.

Figure 2:
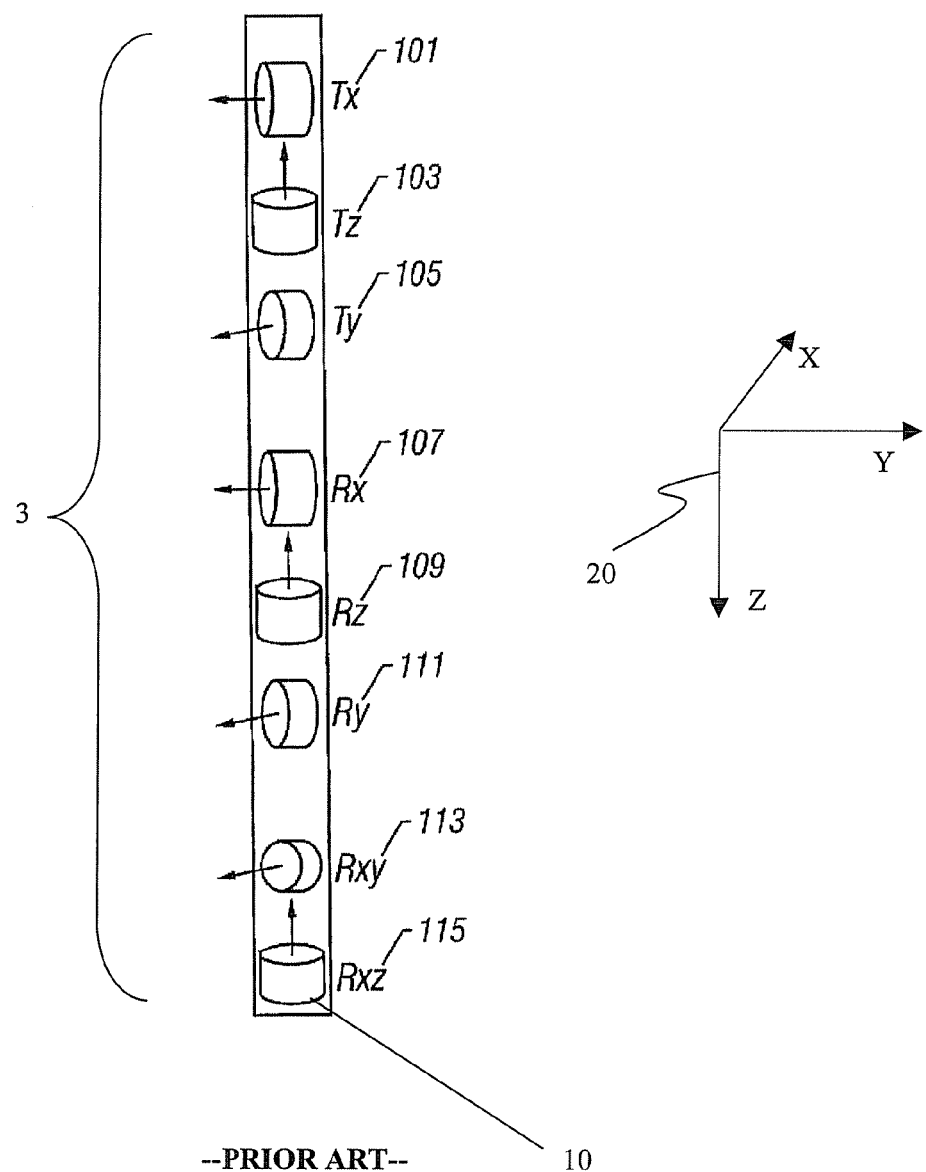
FIG. 2 depicts aspects of a well logging instrument.

Referring to FIG. 2, a prior art embodiment of the EM tool 10 is depicted. In this embodiment, the tool 10 is a multi-component induction tool 10 that includes a set of coils 3 that includes transmitter coils and receiver coils as shown. Three transmitter coils 101, 103 and 105, referred to as the $T_x$, $T_z$, and $T_y$ transmitters are substantially orthogonally oriented (the z-axis being along the longitudinal axis of the tool, as depicted in the legend). The transmitter coils 101, 103 and 105 generate magnetic fields for obtaining measurements in the formations 4 surrounding the borehole 2.

Corresponding to the transmitter coils 101, 103 and 105 are receiver coils 107, 109 and 111, referred to as the $R_x$, $R_z$, and $R_y$ receivers, respectively. The receiver coils 107, 109 and 111 measure aspects of the corresponding magnetic fields, and are also are substantially orthogonally oriented to each other. Additional receiver coils 113 and 115 may be included in some embodiments. One non-limiting example of the tool 10 is the 3DExplorer™ tool, which is an induction logging instrument produced by Baker Hughes of Houston, Tex.

Typically, the well logging tool 10 includes adaptations as may be necessary to provide for operation during drilling or after a drilling process has been undertaken.

More information regarding the 3DExplorer™ tool 10 may be had by turning to the paper "A New Multicomponent Induction Logging Tool to Resolve Anisotropic Formations" by Kriegshäuser, et al, SPWLA 41st Annual Logging Symposium, Jun. 4-7, 2000, the disclosure of which is incorporated by reference herein in its entirety.

The teachings herein provide for collecting data in a near borehole zone using an EM well logging tool having certain design features. In general, the near borehole zone is considered to include portions of the earth within about two feet from the surface of the borehole 2.

In typical embodiments, induction measurements are performed in the frequency $f$ domain using an EM tool having a metal mandrel. These measurements are achieved by, among other things, generation of induction currents I having a maximum intensity in the region of interest. These measurements provide for radial zoning for a distance of up to about two feet from the borehole 2.

The present teachings call for a tool configuration that increase the sensitivity of a measured signal corresponding to a predetermined region of the near borehole zone. In principle, for the area of interest, the teachings make use of induction currents I having a maximum intensity within the area of interest. This approach has a simple physical basis. The electric field is about equal to zero on a surface of the tool. In addition, the electric field $E_m$ asymptotically approaches a value of zero at large distances from the tool 10. This means that there is a maximum intensity of the electric field $E_m$ at some radial distance r from the tool 10. Accordingly, controlling the position of the maximum intensity of the electric field $E_m$ concentrates the electric current I in the zone of interest. Having a concentration of the electric current I in the zone of interest causes an increase in the relative contribution to the total signal from this zone.

Figure 3:
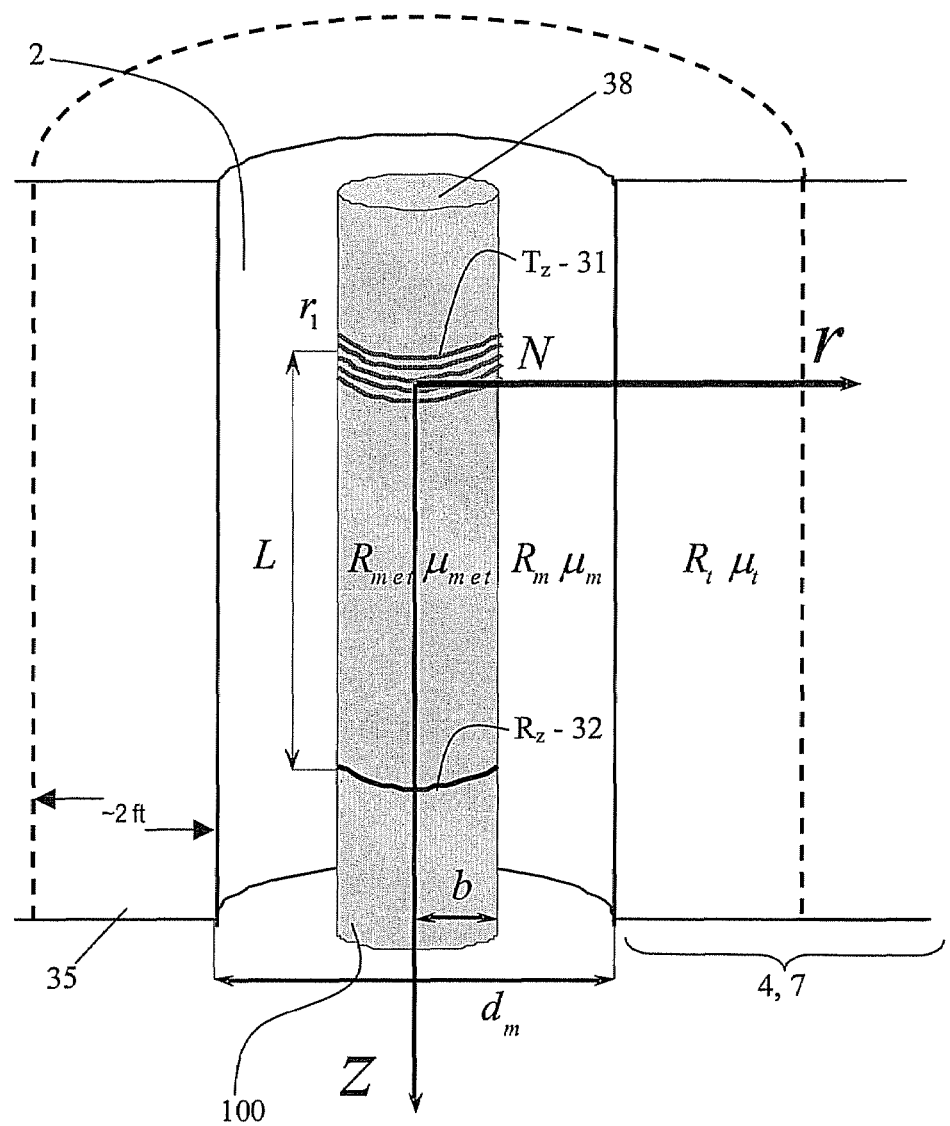
FIG. 3 depicts aspects of a mandrel-type induction tool (EM tool) configuration in one dimensional coaxial cylindrical geometry.
Figure 8A:
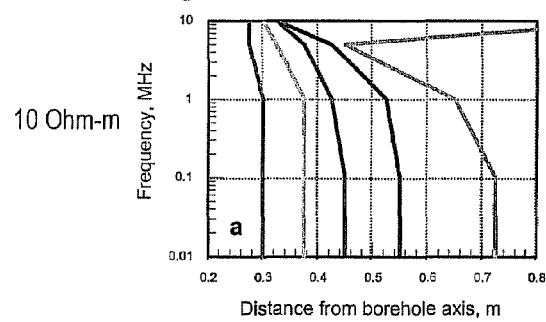
FIG. 8A through FIG. 8D, collectively referred to herein as FIG. 8, depict radial distribution of maxima of induced currents I as a function of frequency $f$ and tool length L.
Figure 8B:
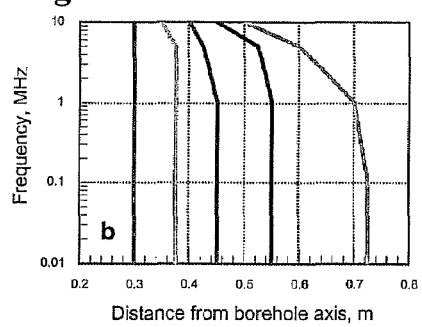
Figure 8C:
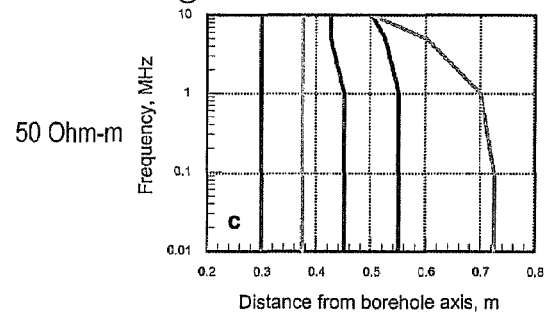
Figure 8D:
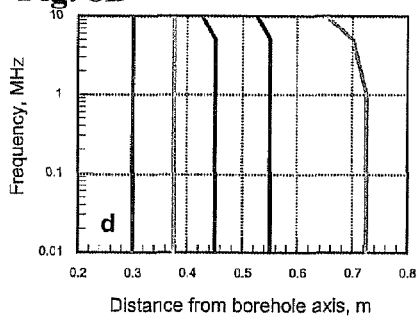
Figure 9A:
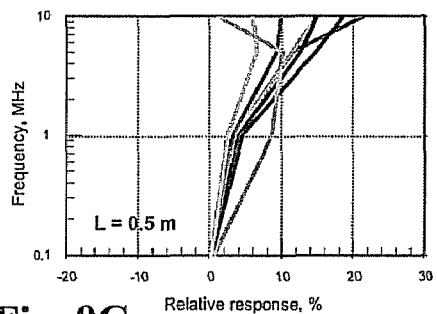
FIG. 9A through FIG. 9D, collectively referred to as FIG. 9, depict relative response from media surrounding the borehole where media resistivity $R_f=1$ Ohm-m.
Figure 9B:
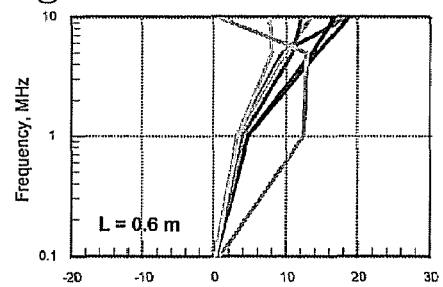
Figure 9C:
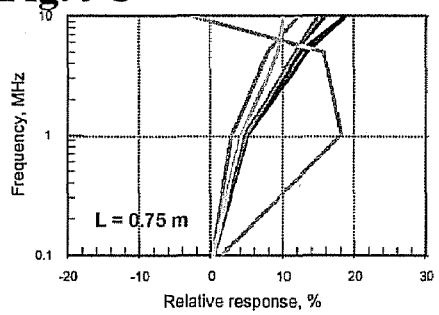
Figure 9D:
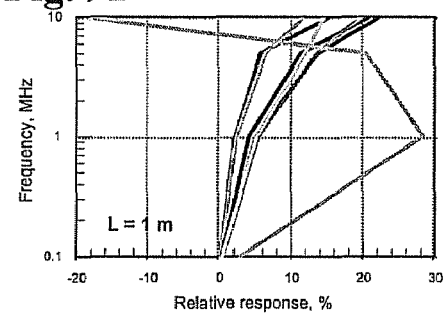

In FIG. 3, an exemplary embodiment of the EM tool 100 according to the present teachings is depicted. In this example, the EM tool 100 is a benchmark model tool. The quantities described in FIG. 3 and the configurations thereof have been used for simulating operation and arriving at results, conclusions and recommendations provided herein. Of course, the model EM tool 100 is presented herein for illustration purposes only, and is not limiting of the various embodiments of the EM tool 100.

In the embodiment depicted, a simple two-coil mandrel-type induction EM tool configuration is provided. The EM tool 100 includes a long metal mandrel 38 of radius b, having metal resistivity $R_{met}$, and metal magnetic permeability $\mu_{met}$. A z-axis transmitter 31 $TX_z$ provides a single transmitter. The transmitter 31 includes a solenoid with N turns and a provides a current I where $I=I_0 e^{-i\omega t}$. A z-axis receiver 32 $RCV_z$ provides a single receiver. The receiver 32 includes a one turn receiving loop. Both the transmitter 31 and receiver 32 are of radius $r_1$, and are wound coaxially around the long metal mandrel 38. A distance between the transmitter 31 and the receiver 32 is represented by the variable L, and describes a functional length for the EM tool 100.

In the embodiment depicted, the EM tool 100 is positioned on the Z-axis of the borehole 2. As indicated above, the borehole 2 traverses the earth 7 and various formations 4 therein. The borehole 2 has a borehole resistivity $R_m$, borehole magnetic permeability $\mu_m$ and borehole radius $r_m$. A near borehole zone 35 (in this embodiment, approximately two feet in depth from the surface of the borehole, in some embodiments, up to about one meter) has a media resistivity $R_t$ and media magnetic permeability $\mu_t$.

Induction Measurements in the Presence of a Metal Mandrel 38. Induction measurements using the long metal mandrel 38 (i.e., formed of metallic materials) call for use of the long metal mandrel 38 that has a length the does not perturb, or substantially perturb measurements or performance of the transmitter 31 and the receiver 32 with edge effects during operation of the EM tool 100. The long metal mandrel 38 is encompassed by solenoid transmitting coils (as the transmitter 31) and receiving coils (as the receiver 32). This configuration is embedded into a homogeneous or two-layered cylindrical medium. Using this design for the EM tool 100, analyses for generated currents I within the near borehole zone 35 wherein the currents provided a maximum intensity in the region of interest were undertaken.

The following steps were performed in order to complete analysis of the EM tool 100 and techniques for use thereof. First, derivations of formulas that represent a solution for boundary problems were completed. Next derivation of low frequency asymptotic expansions were completed. Finally, evaluation of the contributions of different parts of the medium to the measured signal was performed. Discussion in this regard is based on calculations from modeling software and low-frequency asymptotic expansions of the expressions of electromagnetic field components.

As with the prior art, the EM tool 100 is coupled to resources such as electronics 12. The resources (such as the electronics) provide appropriate power to the EM tool 100, and provide for signal reception and analysis.

Calculations were performed to describe spatial distribution of an electric field in a formation 4. The calculations were completed for various frequencies $f_x$ and various distances L between the transmitter 31 and the receiver 32. For the calculations, quantities for other parameters described above were: $r_1$=0.06 m, N=1, $d_m$=0.1 m, b=0.05 m, $R_{met}$=2.5E–7 Ohm*m and $\mu_{met}$=100$\mu_0$.

In the first set of calculations, it was assumed that the borehole 2 was equal in radius to the EM tool 100. That is, no borehole 2 was present when making measurements. Results are depicted in FIG. 4 and FIG. 5. FIG. 4 represents a series of measurements where the distance L between the transmitter 31 and the receiver 32 was 0.5 m. FIG. 5 represents a series of measurements where the distance L between the transmitter 31 and the receiver 32 was 0.75 m.

FIG. 4A and FIG. 5A depict simulated measurements where the media resistivity $R_t$ for the near borehole zone 35 was set equal to 1 Ohm-m. FIG. 4B and FIG. 5B depict simulated measurements where the media resistivity $R_t$ for the near borehole zone 35 was set equal to 10 Ohm-m. FIG. 4C and FIG. 5C depict simulated measurements where the media resistivity $R_t$ for the near borehole zone 35 was set equal to 25 Ohm-m. FIG. 4D and FIG. 5D depict simulated measurements where the media resistivity $R_t$ for the near borehole zone 35 was set equal to 50 Ohm-m. FIG. 4E and FIG. 5E depict simulated measurements where the media resistivity $R_t$ for the near borehole zone 35 was set equal to 100 Ohm-m.

Further calculations were performed for embodiments where no borehole 2 was present. FIG. 6 represents a series of measurements where the distance L between the transmitter 31 and the receiver 32 was 1.0 m. FIG. 7 represents a series of measurements where the distance L between the transmitter 31 and the receiver 32 was 2.0 m.

FIG. 6A and FIG. 7A depict simulated measurements where the media resistivity $R_t$ for the near borehole zone 35 was set equal to 1 Ohm-m. FIG. 6B and FIG. 7B depict simulated measurements where the media resistivity $R_t$ for the near borehole zone 35 was set equal to 10 Ohm-m. FIG. 6C and FIG. 7C depict simulated measurements where the media resistivity $R_t$ for the near borehole zone 35 was set equal to 25 Ohm-m. FIG. 6D and FIG. 7D depict simulated measurements where the media resistivity $R_t$ for the near borehole zone 35 was set equal to 50 Ohm-m. FIG. 6E and FIG. 7E depict simulated measurements where the media resistivity $R_t$ for the near borehole zone 35 was set equal to 100 Ohm-m.

Referring to the graphs of FIGS. 4-7, a percent misfit was calculated between a true values of the electric field $E_m$ and a corresponding low-frequency asymptotic expansion. The misfit is shown as a function of distance r from the borehole axis Z for different frequencies $f$ and distances L. A slight misfit (0-10%) is shown in green G. Misfit greater than 10% and less than 20% is shown in yellow Y. Misfit greater than 20% and less than 30% is shown in yellow O. Misfit that exceeded 30% is shown in red—R. Each of the solid line in the graphs indicates maximal values of the electric field $E_m$ for the calculation.

One skilled in the art can appreciate that the low-frequency asymptotic expansions describe the values of an electric field $E_m$ with good accuracy within a broad range of model parameters. Suppose, for example, that relatively short EM tools 100 are placed in media having media resistivity $R_t$ greater than 10 Ohm-m. In this case, low-frequency expansions describe the behavior of the electric field $E_m$ fairly accurately (that is, misfit does not exceed 20%) up to a frequency $f$ of about 1 MHz (see FIG. 4 and FIG. 5). This holds true even for relatively long EM tools 100 if the formation is more resistive (see FIG. 6 and FIG. 7). However, note that when the misfit is small (less than 10%) the location of the peak of the electric field $E_m$ does not depend (practically) on the values of the model parameters. This is not the case when the misfit is over 30%.

One of the principle goals of obtaining low frequency expansions is to describe the location of the maximal values of the electric field $E_m$. The solid line indicates the position of these maximal values.

The following conclusions were reached from the modeling results. First, increasing frequency $f$ of the current I for the transmitter 31 causes the area having the maximal values for the induced electric field $E_m$ to shift toward the borehole wall. Refer to FIG. 8 (where FIG. 8A corresponds to resistivity media $R_t$ in the near borehole zone 35 of 10 Ohm-m, FIG. 8B where media resistivity $R_t$ is 25 Ohm-m, FIG. 8C, where media resistivity $R_t$ is 50 Ohm-m and FIG. 8D where media resistivity $R_t$ is 100 Ohm-m). This in turn causes an increase in the relative contribution to the signal from the area of the formation 4 next to the borehole.

The amplitude of maximal values shift depends not only on the frequency $f$ of the current I and the media resistivity $R_t$, but also on the distance L between the transmitter 31 and receiver 32. In addition, it should be noted that the outermost maximum intensity point generally does not move even with frequencies up to 1 MHz.

This is true for all EM tools 100 modeled, (L=0.5 m to 2.0 m) and within the broad range of the media resistivity $R_t$ ($R_t$ 10 Ohm-m to 100 Ohm-m). These points correspond to that of low-frequency maximum (LFM) positions. Positions of the LFM maxima can be calculated using asymptotic expansions.

The results of the modeling support use of a plurality of EM tools 100 having varying lengths L and adapted for operation using different frequencies $f$. The plurality provides for focusing the maximum intensity of the electric field $E_m$ at desired radial distances in the near borehole zone 35, where the distances r range from about 0.25 m to about 0.7 m from the borehole axis Z.

In that regard, additional complications that may be encountered during use of EM tools 100 according to the teachings herein have been evaluated. For example, partial contributions from different parts of the media into a measured signal is now considered. One approach for addressing partial contributions from different parts of the media is to generate currents within a near borehole zone 35 with a maximum intensity in the region of interest. To make this happen, a clear understanding is needed of how the elemental parts of how the media contribute to the measured signal.

To understand the flow of current I in the media (i.e., the formation 4), consider that current density can be subdivided into currents flowing in a series of elemental toroids or within rings. These toroids (rings) have a common axis with that of the transmitter and lie in planes perpendicular to this axis (the Z-axis). Due to the axial symmetry, the electric field $E_m$, does not intersect the boundaries of media having different conductivities and therefore surface charges are absent.

Accordingly, a principle of superposition can be applied. This provides for considering the measured signal as a sum of contributions from each of the elemental toroids. The contribution from any particular toroid is proportional to the conductivity of the toroid and to the electrical field $E_m$ inside the toroid.

For example, consider a metal mandrel 38 embedded in a one-dimensional medium having conductivity $\sigma(r)$, a transmitter 31 of radius $r_t$ having one winding and a receiver 32 of radius $r_r$ having one winding, where the transmitter 31 and the receiver 32 are wound around the mandrel 38 at $z=z_t$ and $z=z_r$, respectively (N=1, L=$z_r$−$z_t$).

The total current I flowing in the medium can be subdivided into currents flowing in a series of elemental toroids. The current I in an elemental toroid can be represented as follows:

$$I = \sigma(r) I_0 E_\phi(r_t, z_t, r_T, z_T) dr dz \quad (1)$$

where $r_T$ represents the radius of the elemental toroid, and $z_T$ represents z-coordinates of the elemental toroid, $I_0$ represents current in the transmitter; $E_\phi$=electric field $E_m$ at the point ($r_T$, $z_T$) that is induced by the transmitter 31; and drdz represents a cross-sectional area of the elemental toroid.

To calculate the electromagnetic response $E_\phi^T$ from one elemental toroid, the media resistivity $R_m$ and the borehole resistivity $R_m$ are set to infinity ($\infty$). For convenience, this arrangement is referred to as a "mandrel in the air." Thus, the electromagnetic response $E_\phi^T$ for the mandrel in air from one elemental toroid is expressed as:

$$E_\phi^T = I E_\phi^M(r_t, z_t, r_T, z_T) \quad (2);$$

where $E_\phi^M$ represents an electric field $E_m$ at the point ($r_t$, $z_r$) induced by the transmitter 31 having the one-turn current loop of radius of $r_T$ for the presence of the mandrel in the air. In this arrangement, the one-turn current loop of radius of $r_T$ is located at $z=z_T$.

Therefore, a total electromagnetic response $E_\phi^V$ from a volume V within the media can be expressed as follows:

$$E_\varphi^V = E_\varphi^P + I_0 \sum_{(r,z) \in V} E_\varphi^T, \quad (3);$$

where $E_{100}^P = I_0 E_\phi^M(r_t, z_t, r_r, z_r)$ represents the primary electric field generated by the transmitter 31 in the presence of the mandrel in the air. To verify the quality of the computations, the whole signal from all the elemental toroids was compared with the signal in the cylindrically-layered medium. The verification provides a resulting misfit that does not exceed 13%.

Figure 10A:
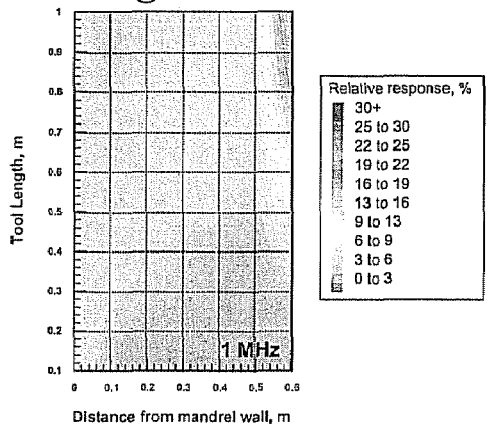
FIG. 10A through FIG. 10C, collectively referred to herein as FIG. 10, depict relative contributions from different sub-zones as a function of frequency $f$.
Figure 10B:
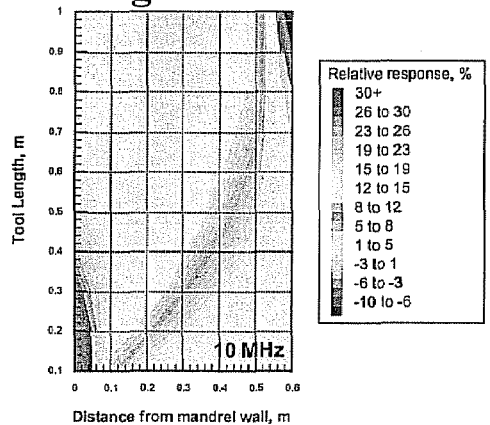
Figure 10C:
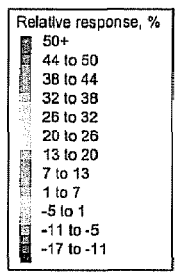

FIG. 9 and FIG. 10 demonstrate how different parts of the media contribute to the measured signal. FIG. 9 shows that at low frequencies the secondary field is fairly small in comparison with the field in the background model. With an increase in the frequency $f$ the primary field decreases significantly, and all regions begin to make sizable contribution to the total signal. At frequencies $f$ above 5 MHz, the relative contribution from the formation tends to zero and goes to a negative as the frequency $f$ increases. FIG. 10 shows the pattern of partial contributions as a function of tool length L. In FIG. 10, dm=0.1 m, the borehole resistivity $R_t$=1 Ohm-m and the media resistivity $R_t$=10 Ohm-m.

One skilled in the art can conclude on the basis of the foregoing that the depth of investigation for short EM tools 100 is much shallower than the depth of investigation for long EM tools 100. As the frequency $f$ increases, induced currents I are concentrated mainly within the borehole 2. If the tool length L is greater than about 0.2 m, the radial size of the region that makes the dominant (and positive) contribution to the signal generally does not exceed about 0.2 meters to about 0.3 meters from the borehole wall.

At distances r from the z-axis of the borehole 2 (where r ranges from about 0.25 meters to about 0.7 meters) it is possible to generate currents I with a maximum intensity in the region of interest.

In some embodiments, the EM tool 100 is combined with other tools 10. For example, the EM tool 100 discussed herein may be included within or in conjunction to the multi-component induction tool of the prior art.

In some other embodiments, a series of EM tools 100 according to the teachings herein are used in concert. For example, a first EM tool 100 having a first length $L_1$ is used in a tool string with a second EM tool 100 having a second length $L_2$. The first EM tool 100 and the second EM tool 100 may be used simultaneously, separately, at varying frequencies, one as a back up to the other, etc, . . .

Further, in some embodiments, at least one transmitter 31 and at least one receiver 32 are disposed along a single metal mandrel 38 to form separate circuits. That is, for example, a plurality of transmitters 31 may be used in conjunction with a single receiver 32 (or vice versa) to provide for the EM tool 10 that appears to have multiple lengths. These circuits may also be used simultaneously, separately, at varying frequencies, one as a back up to the other, etc, . . .

Figure 11:
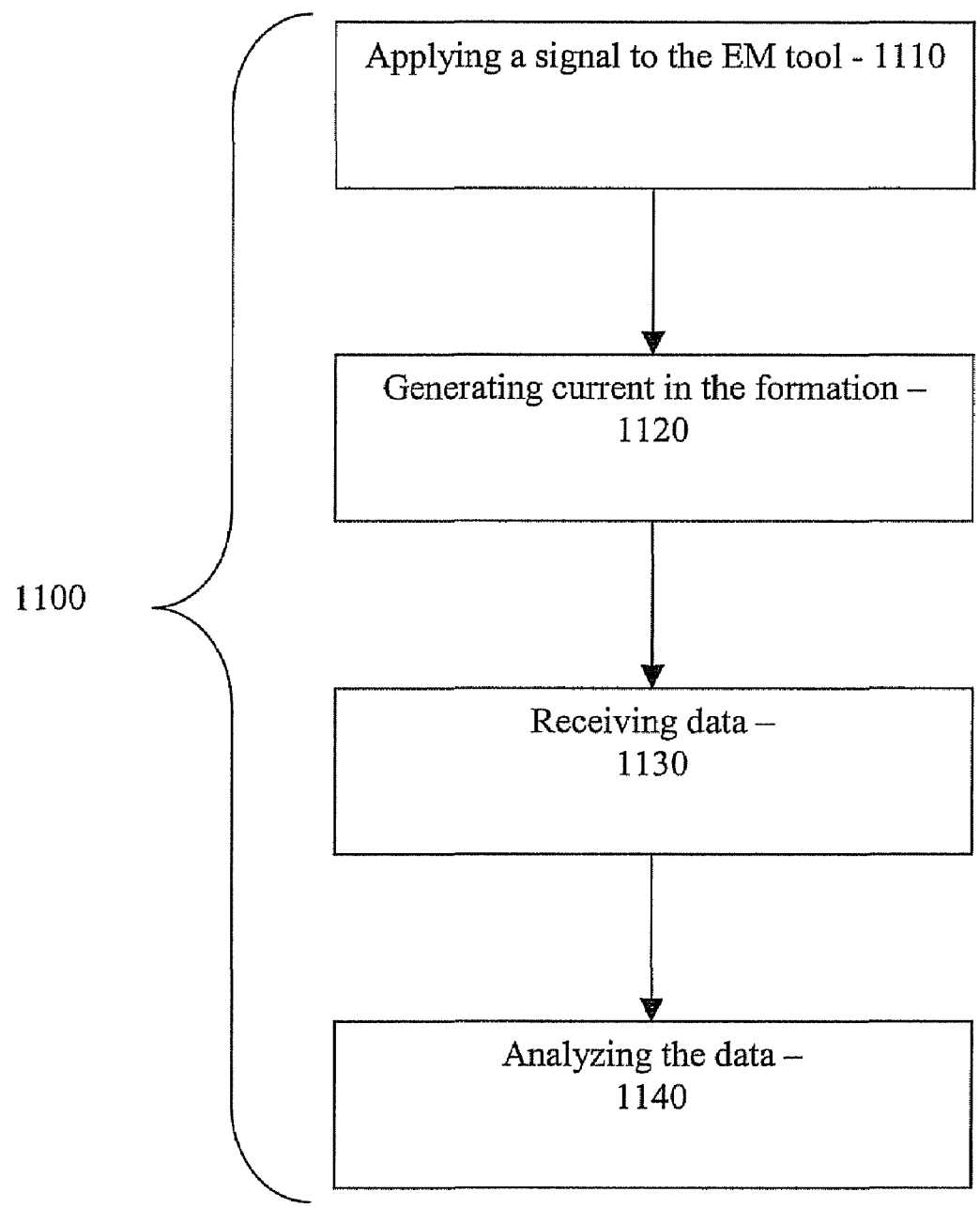
FIG. 11 depicts an exemplary embodiment for use of the EM tool.

FIG. 11 depicts an exemplary embodiment for use of the EM tool 100. In FIG. 11, performing measurements in the near borehole zone 1100 includes: applying a signal to the EM tool in a first step 1110, generating the current I within the near borehole zone in a second step 1120; receiving and measuring signals coming from the currents flowing in the predetermined part of the near borehole zone as a third step 1130; and analyzing the data to determine the properties of the formations in a fourth step 1140. Typically, analyzing involves techniques as are known in the art for analyzing electromagnetic data from induction tools 10. Accordingly, analysis techniques are not discussed in greater depth herein. However, analysis techniques provide for determination of various aspects, such as, for example, filtration capacity for a local reservoir, permeability, capillary pressure, and relative permeability of the surrounding formations.

To say it in other words, the teachings herein provide for a "transfer" or "shift" of the current maximum within the near borehole zone and then "stopping" this maximum in the region of interest. This technique results in a capability to get readings from different regions of interest within the near borehole zone.

As described above, embodiments can be embodied in the form of computer-implemented processes and apparatuses for practicing those processes. In exemplary embodiments, aspects of the invention are embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A tool for performing electromagnetic measurements within a borehole, the tool comprising:
    a transmitter comprising a coil having N-turns wound coaxially around a long metallic mandrel and a receiver comprising a coil having a one-turn receiving loop wound coaxially around the mandrel; wherein the transmitter is adapted for providing a current I of a predetermined frequency $f$ at a maximum intensity in near borehole zone; and wherein the receiver is disposed a distance L from the transmitter and adapted for receiving a signal from the transmitter.

2. The tool as in claim 1, wherein the distance L is between about 0.4 meters and about 2.0 meters.

3. The tool as in claim 1, wherein the distance L is selected for providing the maximum intensity at a predetermined distance from a central axis of the tool.

4. The tool as in claim 1, wherein the frequency $f$ is between about 0.001 MHz and about 10 MHz.

5. The tool as in claim 1, wherein the near borehole zone comprises a zone extending from a surface of the tool up to about one meter.

6. The tool as in claim 1, wherein a length of the long metallic mandrel comprises a length that does not substantially perturb performance of the transmitter and the receiver during operation of the tool.

7. A method for determining properties of formations in a near borehole zone, the method comprising:
    applying a signal to a tool disposed into a borehole, the tool comprising a transmitter comprising a coil having N-turns wound coaxially around a long metallic mandrel and a receiver comprising a coil having a one-turn receiving loop wound coaxially around the mandrel; wherein the transmitter is adapted for providing a current I of a predetermined frequency $f$ at a maximum intensity in near borehole zone; and wherein the receiver is disposed a distance L from the transmitter and adapted for receiving a signal from the transmitter;
    generating the maximum intensity of the current I within the near borehole zone;
    receiving the signal from the near borehole zone with the receiver; and
    analyzing the signal to determine the properties of the formations.

8. The method as in claim 7, wherein analyzing provide for determination of at least one of filtration capacity for a local reservoir, permeability, capillary pressure, and relative permeability of the surrounding formations.

9. The method as in claim 7, wherein the generating comprises generating the maximum intensity in a predetermined part of the near borehole zone.

10. The method as in claim 7, further comprising generating the maximum intensity at a plurality of predetermined locations to provide for determination of the properties at each of the locations.

11. A computer program product stored on machine readable media and comprising instructions for determining properties of formations in a near borehole zone, by:
    applying a signal to a tool disposed into a borehole, the tool comprising a transmitter comprising a coil having N-turns wound coaxially around a long metallic mandrel and a receiver comprising a coil having a one-turn receiving loop wound coaxially around the mandrel; wherein the transmitter is adapted for providing a current I of a predetermined frequency $f$ at a maximum intensity in near borehole zone; and wherein the receiver is disposed a distance L from the transmitter and adapted for receiving a signal from the transmitter;
    generating the maximum intensity of the current I within the near borehole zone;
    receiving the signal from the near borehole zone with the receiver; and
    analyzing the signal to determine the properties of the formations.

12. The method as in claim 11, wherein analyzing provide for determination of at least one of filtration capacity for a local reservoir, permeability, capillary pressure, and relative permeability of the surrounding formations.

13. The method as in claim 11, wherein the generating comprises generating the maximum intensity in a predetermined part of the near borehole zone.

14. The method as in claim 11, further comprising generating the maximum intensity at a plurality of predetermined locations to provide for determination of the properties at each of the locations.

* * * * *